United States Patent

[11] 3,526,251

| [72] | Inventor | Borje O. Rosaen<br>Ann Arbor, Michigan |
|---|---|---|
| [21] | Appl. No. | 697,855 |
| [22] | Filed | Jan. 15, 1968 |
| [45] | Patented | Sept. 1, 1970 |
| [73] | Assignee | By mesne assignments, to<br>Parker-Hannifin Corporation<br>Cleveland, Ohio<br>a corporation of Ohio |

[54] FLUID FILTER WITH SHUT-OFF VALVES
6 Claims, 4 Drawing Figs.
[52] U.S. Cl. ................................................. 137/625.29,
210/234
[51] Int. Cl. ...................................................... F16k 11/00
[50] Field of Search ............................................ 137/625.29,
599.1, 625.48

[56] References Cited
UNITED STATES PATENTS
| 2,553,458 | 5/1951 | Jordan.......................... | 137/625.29 |
| 3,411,538 | 11/1968 | Gruner et al.................. | 137/625.29 |

*Primary Examiner*—Arnold Rosenthal
*Attorney*—Hauke, Gifford and Patalidis

ABSTRACT: A filter device in a fluid system having a valve with a spool element shiftable in a bore between a first position permitting the delivery of unfiltered fluid through the filter inlet and discharge of filtered fluid through the filter outlet and a second position where the valve opens a bypass and a pressure relief passage in the filter housing so that the filter can be serviced without interrupting the operation of the fluid pump means in the system.

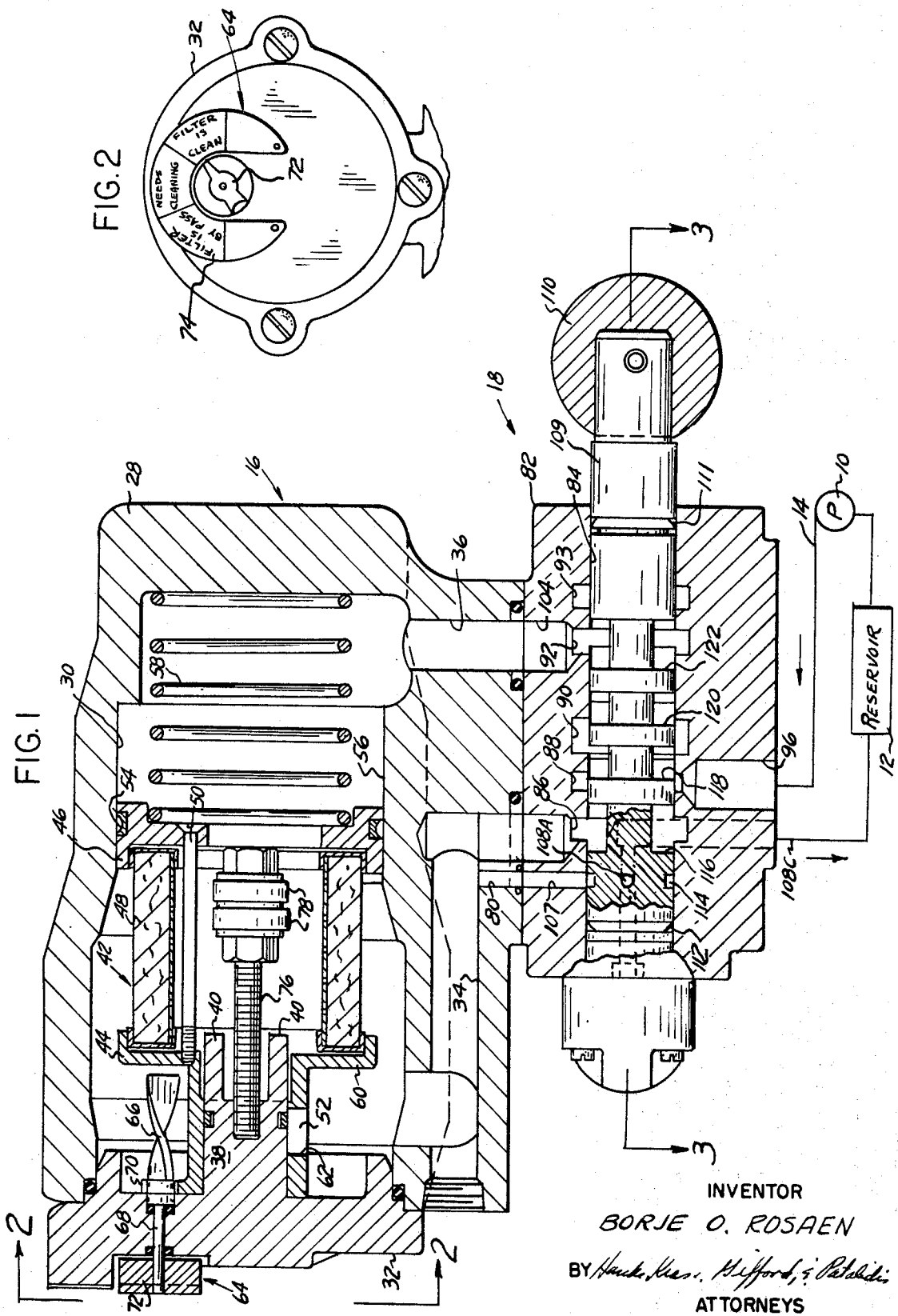

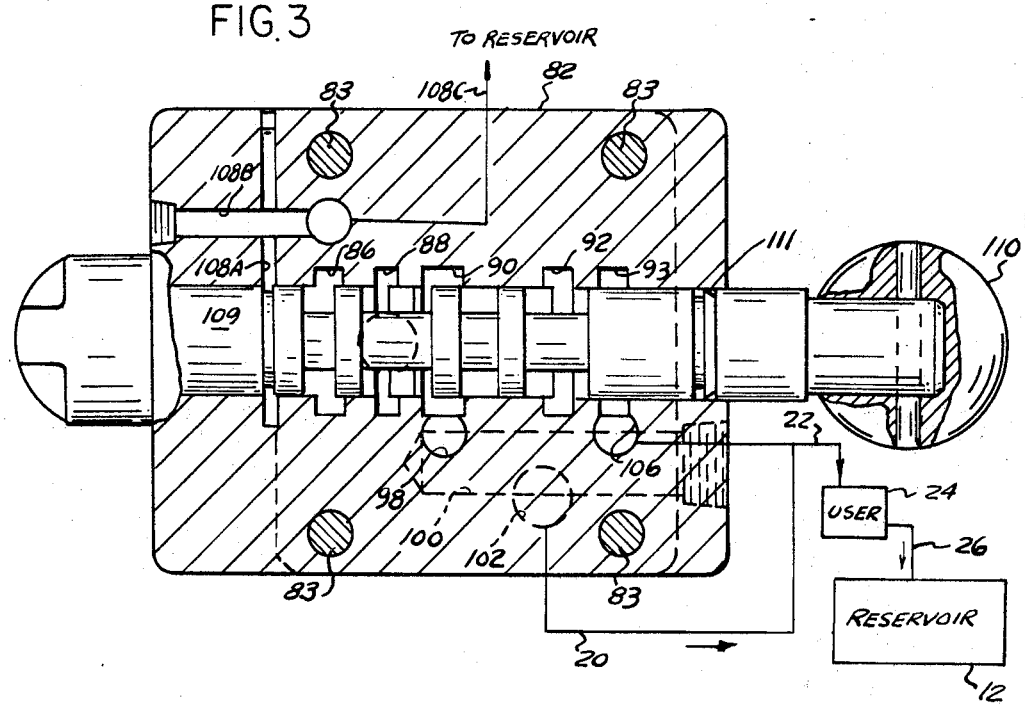
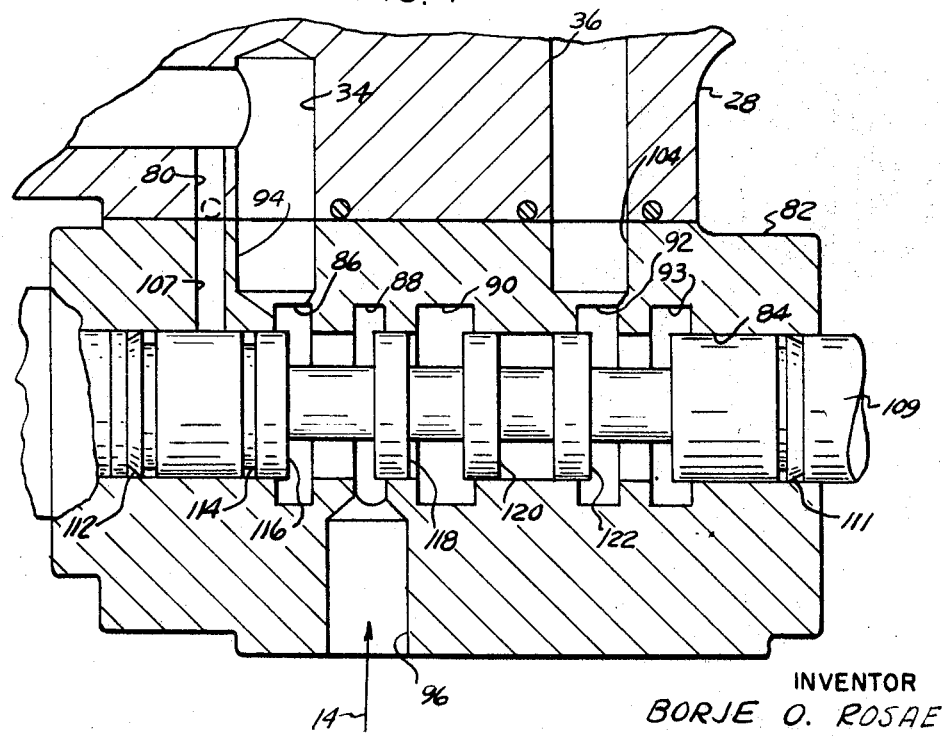

3,526,251

FLUID FILTER WITH SHUT-OFF VALVES

BACKGROUND OF THE INVENTION

1. Field of Invention

This invention relates to fluid devices and more specifically to a two-position, four-way valve for controlling the fluid flow in a system to a fluid device.

2. Description of the Prior Art

It is frequently desirable to isolate a fluid device in a fluid system without interrupting the fluid flow to other fluid components. For instance, it may be necessary to replace the element in a fluid filtering device in the system without interrupting the flow to a fluid user or interrupting the operation of the pump which pressurizes and transfers the fluid through the system.

It is the broad purpose of the present invention to provide a novel valve means which permits a fluid device to be quickly and easily isolated from a fluid system without interrupting fluid flow through the remainder of the system.

SUMMARY

The preferred embodiment of the present invention is incorporated in a fluid system having a filter with an internally mounted element which periodically becomes clogged and requires replacement or cleaning. In order to perform this operation without interrupting the operation of the pump in the system, it is necessary to fluidly isolate the filter. The filter comprises a housing having an internal chamber with a removable cover permitting access to the chamber and the filter element disposed therein, an inlet for receiving unfiltered fluid into the chamber and an outlet for discharge of filtered fluid. A two-position, four-way valve is mounted on the housing and comprises a valve body having a cylindrical bore with a spool element mounted in the bore for movement between a pair of operative positions. The valve body has a series of internal passages for connecting the inlet and outlet of the filter, the pressure, return and the bypass lines of the fluid system with the bore. In addition, a pair of pressure relief passages in the filter which also function as drain passages are connected with the system by the valve.

The spool has a series of annular grooves separated by land means which in one of the operative positions of the spool connect the inlet of the filter housing with the pressure line of the fluid system, and the outlet of the filter with the return line for returning the filtered fluid to the system. In this filtering position, the bypass in the valve body is closed and the pressure relief passages are closed. When the spool is shifted by a suitable mechanical linkage to the bypass position, it closes the filter's inlet and outlet and opens the bypass passage so that the system fluid bypasses the filter. It also opens the pressure relief passages so that the fluid pressure in the filter can be relieved as well as providing means for draining the fluid in the filter so that the cover can be removed to service the filter element.

Thus, the preferred embodiment of the invention provides means for isolating a fluid device in a fluid system which can be mounted as an integral part of the filter device. In addition, the preferred valve provides means for releasing the pressure in the filter as well as draining the filter without interrupting the fluid flow in the remainder of the system.

These and other advantages of the present invention will become readily apparent to one skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is a longitudinal sectional view through a filter combined with a cutout valve in the bypass condition illustrating the preferred embodiment of the invention and incorporated in a fluid system which is illustrated schematically;

FIG. 2 is a view of the filter as seen along line 2—2 of FIG. 1;

FIG. 3 is a sectional view of the valve as seen along lines 3—3 of FIG. 1; and

FIG. 4 is an enlarged fragmentary view of the valve of FIG. 1 showing the spool in the delivery position for delivering fluid to the filter.

DESCRIPTION OF THE PREFERRED EMBODIMENT

Now referring to the drawings, FIG. 1 illustrates a fluid system comprising a pump 10 which draws fluid from a reservoir 12 through a supply line 14 and delivers the pressurized fluid to a filter means 16. A cut-out valve 18 on the filter means 16 controls the flow of fluid through the filter means 16. Referring to FIG. 3, the fluid flows from the filter means 16 and the valve 18 through either a bypass line 20 or a return line 22 to a fluid user 24. The fluid is returned from the user 24 through a second return line 26 back to the reservoir 12 to complete its circuit.

As best seen in FIG. 1, the filter means 16 comprises a housing 28 having an internal filter chamber 30. A removable cover 32 mounted on the housing 28 provides access into the chamber 30. The housing 28 further has an inlet passage 34 for receiving unfiltered fluid into the filter chamber 30 and an outlet passage 36 for the discharge of the filtered fluid. The cover 32 has an integral, inwardly directed guide portion 38 which terminates in three guide fingers 40.

A filter assembly 42 is movably mounted in the filter chamber 30 and comprises a pair of cap members 44 and 46 mounting a cylindrical porous filter element 48 with the caps 44, 46 and a filter element 48 retained together by a series of elongated through bolts 50 (only one of which is shown). The cap 44 has a cylindrical portion 52 which is slidably mounted on the guide portion 38. The cap 46 has a piston ring 54 slidably engaged with a cylindrical wall section 56 of the chamber 30 so that the filter element 48 can move toward and away from the cover 32 along the longitudinal axis of the filter chamber 30. A spring member 58 acts between the cap 46 and the housing 28 to urge the filter assembly 42 toward the cover 32.

In operation, the unfiltered fluid enters the filter housing 28 through the inlet 34 and is introduced into the chamber 30 where it passes radially inwardly through the element 48 and then axially through the element toward the outlet 36. As the element 48 accumulates matter filtered from the fluid, a pressure differential is developed across the filter element 48 which is reflected on pressure responsive surface 60 of the cap 44. As this pressure differential increases, the net force acting on the filter element 48 causes the filter assembly 42 to move axially against the bias of the spring 58. As the cap 44 moves axially away from the cover 32, a port 62 in the cap registers with the fingers 40 so that the fluid introduced through the inlet 34 can pass directly into the inner side of the element 48, bypassing the wall 60 of the element 48. This prevents the element 48 from substantially reducing the fluid flow in the system when it becomes clogged. When the element 48 has been replaced by removing the cover 32, the clean element 48 under the bias of the spring 58 assumes its position adjacent the cover 32.

Indicating means 64 provide means for visually indicating the internal condition of the filter element 48 as reflected by its position relative to the cover 32. Indicating means 64 comprises an actuating element 66 having a longitudinal twist and rotatably carried on the inner end of an actuating pin 68 which is sealingly supported in the cover 32. The actuating element 66 engages a slotted flange 70 carried by the cylindrical portion of the cap 44 so that as the cap moves axially its motion is transformed into rotation of the actuating pin 68. As can best be seen in FIG. 2 an indicating arrow 72 carried on the outer end of the pin 68 is adapted to traverse an indicating plate 74 having indicia reflecting the filtering condition of the element 48.

The filter means 16 also comprises an elongated member 76 which extends inwardly from the guide portion 38 of the cap and supports magnet means 78 for removing metallic particles and the like from the fluid as it flows through the filter 48.

The housing 28 also has a drain passage 80 which is in the lower part of the housing 28 and extends adjacent the inlet port of the inlet 34.

Referring to FIGS. 1, 3 and 4, the valve 18 comprises a valve body 82 mounted by fastening members 83 to the filter body 28. The body 82 has a bore 84 formed upon a longitudinal axis with circumferential grooves 86, 88, 90, 92 and 93. The valve body 82 also has a delivery passage 94 connecting the annular groove 86 with the inlet 34 of the valve body, a pressure passage 96 connecting the delivery line 14 from the pump 10 with the annular groove 88, bypass passages 98, 100 and 102 connecting the annular groove 90 with the bypass line 20, a first return passage 104 connecting the outlet 36 of the filter means 16 with the annular groove 92 and a second return passage 106 connecting the annular groove 93 with the return line 22.

The valve body 82 also has a first bleed passage 107 connecting the pressure relief passage 80 of the filter body with the bore 84 and second and third bleed passages 108A and 108B connecting the bore 84 to a drain line 108C which is connected to the reservoir 12.

A spool 109 is axially slidably mounted in the bore 84 for movement between a first operative or bypass position illustrated in FIG. 1 and a second operative or filtering position illustrated in FIG. 4. The outer end of the spool 109 carries a ball element 110 which provides means for coupling the spool 109 to a suitable mechanical actuating linkage (not shown). The spool 109 carries seal means 111 adjacent its outer end and a second seal means 112 adjacent its inner end for providing a fluid-tight seal between the spool 109 and the valve bore 84. The spool 109 has circumferential grooves 114, 116, 118, 120 and 122 separated by land means which slidably engage the bore 84.

It will be noted that the pressure passage 96 and the delivery passage 80 are on one side of the bypass passages 98, 100, 102 and the return lines 104 and 106 are on the opposite side of the bypass passages 98, 100, and 102. In addition, the circumferential grooves 114, 116, 118, 120 and 122 are arranged such that when the spool 109 is in the bypass position, the grooves 114, 124 and 116 provide a fluid connection between the bleed line 107 and the bleed line 108A so that the pressure within the filter element 16 can be relieved and the fluid drained prior to removing the cap 32 for servicing the filter element 48. In the bypass position, the land means separating the grooves 116 and 118 blocks fluid flow from the pressure passage 96 to the delivery passage 94 and the land means at the right end of groove 122 blocks fluid flow from the return line 104 to the return line 106 so that the filter element 48 is substantially fluidly isolated from the fluid system. In this position, the circumferential groove 118 is positioned to form a fluid connection from the pressure passage 96 to the annular groove 90 and the bypass passage 98 so that the fluid in the system can be circulated through the valve body 82 without interrupting the operation of the pump 10.

When the filter element 48 in the filter means 16 has been serviced, the spool 109 is shifted toward its alternate or filtering position so that the groove 114 is not in registry with the bleed lines 107 and 108A so that flow through the bleed lines is blocked. The groove 116 forms a connection between the pressure passage 96 and the delivery passage 94 so that unfiltered fluid is delivered to the inlet 34 of the filter housing 28. The land means separating the grooves 116 and 118 block fluid flow from the pressure passage 96 to the bypass passage 98, and the groove 122 is positioned to provide a connection between the return line 104 and the return line 106 so that the filtered fluid discharged from the filter means 16 can return to the system.

Thus, it can be seen that I have described a novel two-position, four-way valve which in one operative position bypasses the system fluid around the filter means 16 while providing means for decompressing and draining the fluid from the filter housing 28 so that the element can be serviced. In its alternate operative position, the spool 109 closes the pressure relief passages and the bypass passages so that the system fluid is delivered into the filter means 16 and is removed from the filter means 16 after being treated in the filter chamber 30.

It is to be understood that although I have described only one embodiment of my invention, various changes and revisions can be made therein without departing from the spirit of the invention as expressed in the scope of the appended claims.

I claim:

1. In combination with a fluid device having an inlet for receiving a fluid, and an outlet for the discharge of the fluid, a valve for controlling the fluid delivered to the fluid device, comprising:
   a. a valve body adapted for mounting on said fluid device and having:
      1. a bore formed along an axis;
      2. a bypass passage connected with said bore;
      3. a pressure passage connected with said bore at a point spaced from the connection of said bypass passage for receiving fluid from a source;
      4. a delivery passage connecting the inlet of the fluid device with said bore at a point spaced from the connection of said pressure passage;
      5. a first return passage connecting the outlet of the fluid device with said bore; and
      6. a second return passage for connecting said bore to a fluid return line from a point spaced from the connection of said first return passage;
   b. a spool axially movable in said bore having:
      1. a first circumferential groove; and
      2. a second circumferential groove axially spaced from said first circumferential groove to form a circumferential land between said grooves;
   c. means for axially displacing said spool in said bore between a first axial position wherein said first circumferential groove connects said pressure passage with said delivery passage for the introduction of fluid from said source into said fluid device, and said land blocks fluid flow from said pressure passage to said bypass passage; and a second axial position wherein said second circumferential groove connects said pressure passage with said bypass passage, and said land blocks flow from said pressure passage to said delivery passage; and
   d. said spool bore having a third circumferential groove connecting said first and second return passage when said spool is in the first position and said spool has land means separating said first and second return passages when said spool is in the second position.

2. A valve, comprising:
   a. a valve body having a bore formed along an axis and a first inlet passage and first and second outlet passages connected with said bore;
   b. a spool shiftable in said bore between first and second axial positions, said spool having first and second circumferential grooves formed in land means, the first of said grooves connecting said inlet and the first of said outlets and said land means separating the first inlet and the second of said outlets when the spool is in its first position, and the second of said grooves connecting the inlet with the second of said outlets and said land means separating said inlet with the first of said outlets when the spool is in the second of said positions; and
   c. said valve body having a second inlet connected with said bore and a third outlet connected with said bore axially spaced from said first and second outlets and said spool having a third circumferential groove axially spaced from said first and second circumferential grooves and formed in said land means and connecting said second inlet with said third outlet when the valve is in the first position and disconnected from said second inlet and said third outlet when the spool is in the second position.

3. The combination as defined in claim 2, wherein said valve body has a third inlet passage connected with said bore and a fourth outlet passage connected with said bore and wherein said spool has a fourth groove means connecting said third inlet with said fourth outlet when the spool is in the second position and disconnected between said third inlet and said fourth outlet when the spool is in the first position.

4. In combination with a fluid device having an inlet for receiving a fluid, and an outlet for the discharge of the fluid, a valve for controlling the fluid delivered to the fluid device, comprising:
   a. a valve body adapted for mounting on said fluid device and having:
      1. a bore formed along an axis;
      2. a bypass passage connected with said bore;
      3. a pressure passage connected with said bore at a point spaced from the connection of said bypass passage for receiving fluid from a source;
      4. a delivery passage connecting the inlet of the fluid device with said bore at a point spaced from the connection of said pressure passage;
      5. a first return passage connecting the outlet of the fluid device with said bore;
      6. a second return passage for connecting said bore to a fluid return line from a point spaced from the connection of said first return passage;
   b. a spool axially movable in said bore having:
      1. a first circumferential groove;
      2. a second circumferential groove axially spaced from said first circumferential groove to form a circumferential land between said grooves;
   c. means for axially displacing said spool in said bore between a first axial position wherein said first circumferential groove connects said pressure passage with said delivery passage for the introduction of fluid from said source into said fluid device, and said land blocks fluid flow from said pressure passage with said bypass passage; and a second axial position wherein said second circumferential groove connects said pressure passage to said bypass passage, and said land blocks flow from said pressure passage to said delivery passage; and
   d. said fluid device having a pressure relief passage, and said valve body having a first bleed passage connecting said pressure relief passage and said bore, and a second bleed passage connecting said bore to said bleed return line, and said spool having passage means blocking fluid flow from said first bleed passage to said second bleed passage when said spool is in the first position and land means connecting said first bleed passage with said second bleed passage when the spool is in the second position.

5. The combination as defined in claim 4, wherein said spool has a third circumferential groove disposed in said bore for fluidly connecting said first and second return passages when the spool is in the first axial position, and land means for blocking fluid flow from said first return passage to said second return passage when the spool is in the second axial position.

6. In combination with a fluid device having an inlet for receiving a fluid, and an outlet for the discharge of the fluid, a valve for controlling the fluid delivered to the fluid device, comprising:
   a. a valve body adapted for mounting on said fluid device and having:
      1. a bore formed along an axis;
      2. a bypass passage connected with said bore;
      3. a pressure passage connected with said bore at a point spaced from the connection of said bypass passage for receiving fluid from a source;
      4. a delivery passage connecting the inlet of the fluid device with said bore at a point spaced from the connection of said pressure passage;
      5. a first return passage connecting the outlet of the fluid device with said bore;
      6. a second return passage for connecting said bore to a fluid return line from a point spaced from the connection of said first return passage;
   b. a spool axially movable in said bore having:
      1. a first circumferential groove;
      2. a second circumferential groove axially spaced from said first circumferential groove to form a circumferential land between said grooves;
   c. means for axially displacing said spool in said bore between a first axial position wherein said first circumferential groove connects said pressure passage with said delivery passage for the introduction of fluid from said source into said fluid device, and said land blocks fluid flow from said pressure passage to said bypass passage, and a second axial position wherein said second circumferential groove connects said pressure passage with said bypass passage, and said land blocks flow from said pressure passage to said delivery passage; and
   d. said fluid device having a pressure relief passage and said valve body having a first bleed passage connecting the pressure relief valve of said device to said bore and a second bleed passage connecting said bore to a bleed return line, and said spool having third and fourth circumferential grooves, said third circumferential groove connecting said first and second return passages when the spool is in the first axial position, said fourth circumferential groove connecting said first and second bleed passages when said spool is in the second axial position, and land means blocking flow from said first return passage to said second return passage when said spool is in the second position and blocking flow between said first and second bleed passages when said spool is in the first position.